(12) United States Patent
Belkov

(10) Patent No.: US 7,178,476 B1
(45) Date of Patent: Feb. 20, 2007

(54) RETRACTABLE WINDSHIELD

(76) Inventor: Larry Paul Belkov, 127 Severn Ave., Annapolis, MD (US) 21403

( * ) Notice: Subject to any disclaimer, the term of this patent is extended or adjusted under 35 U.S.C. 154(b) by 0 days.

(21) Appl. No.: 11/320,854

(22) Filed: Dec. 30, 2005

(51) Int. Cl.
*B63B 17/02* (2006.01)
*B60J 1/02* (2006.01)

(52) U.S. Cl. .................................. 114/361; 296/96.13
(58) Field of Classification Search .............. 114/361; 296/89, 96.13
See application file for complete search history.

(56) References Cited

U.S. PATENT DOCUMENTS 2,836,140 A * 5/1958 Hunt, Jr. ................. 114/201 R
3,021,535 A * 2/1962 Dorst ......................... 114/361
3,320,698 A * 5/1967 Hummel ....................... 49/340
3,906,563 A * 9/1975 Bramhalt ..................... 114/361
6,820,917 B2 * 11/2004 Grubbs .................. 296/107.17

* cited by examiner

*Primary Examiner*—Jesús D. Sotelo
(74) *Attorney, Agent, or Firm*—Westerman, Hattori, Daniels & Adrian, LLP.

(57) ABSTRACT

Disclosed is a retractable windshield apparatus including first and second opposing traveler tracks adapted to receive and slide the lateral edges of a windshield in a mounting. The apparatus also includes a first retracting rod functionally attached to the first traveler track, a first pivot device functionally attached to the first retracting rod, and a first power source functionally attached to the first pivot device.

10 Claims, 3 Drawing Sheets

RETRACTABLE WINDSHIELD

The present invention relates to an apparatus designed to retract a windshield of a craft, preferably a water craft, more preferably a boat, from its service position to a withdrawn position and later to restore the windshield to its service position. The apparatus includes a power source, a pivot device, a retracting rod, and traveler track structure, which permits an operator to activate power source, thereby moving the pivot device and the retracting rod to draw a windshield backward and forward with the traveler track structure along a mount, so that the windshield may be moved from its service position to a withdrawn position and back again to its service position.

BACKGROUND OF THE INVENTION

An operator of a craft, particularly a boat operator, faces different circumstances. For instance, when the boat is moving through the water, even at a moderate rate of speed, spray from the water or rain strikes the operator. It is therefore desirable for the boat to be equipped with a windshield to protect the operator from spray and rain. Windshields, however, obstruct proper ventilation of the boat in the operator area, and can create a "station wagon effect" by drawing exhaust fumes into the open rear passenger area of the boat.

An alternative to fixed windshields are "clear curtains" which can be snapped into place. Unfortunately, clear curtains often become scratched or discolored with age, and are therefore an unsightly annoyance when the boat is at rest and there is no rain, or even dangerous to the extent that such scratching and discoloration impedes the operator's ability to see. Further, since wipers are impractical with clear curtains, the operator's ability to see is further impeded.

Accordingly, there is a need for an apparatus which accommodates both types of conditions, specifically an apparatus which permits the operator to move the windshield from its service position to a withdrawn position when it is not needed, and back again to its service position when protection from spray and rain is needed.

SUMMARY OF THE INVENTION

The retractable windshield apparatus includes first and second opposing traveler tracks adapted to receive and slide the lateral edges of a windshield, the first and the second opposing traveler tracks located in a mounting, a first retracting rod functionally attached to the first traveler track, a first pivot device functionally attached to the first retracting rod, and a first power source functionally attached to the first retracting rod. In preferred embodiments, the apparatus includes a second retracting rod functionally attached to the second traveler track, a second pivot device functionally attached to the second retracting rod, and a second power source functionally attached to the second retracting rod.

In use, the operator activates the power sources to pull or push on the retracting rods. Because of the pivot devices, the movement of the retracting rods pulls or pushes on the traveler track, causing the windshield to move from its service position to a withdrawn position. Additionally, the operator may use the power sources to operate the structure in reverse, causing the windshield to move back again to its service position.

DETAILED DESCRIPTION OF THE INVENTION

The invention will now be described according to a preferred embodiment thereof.

Figure 1:
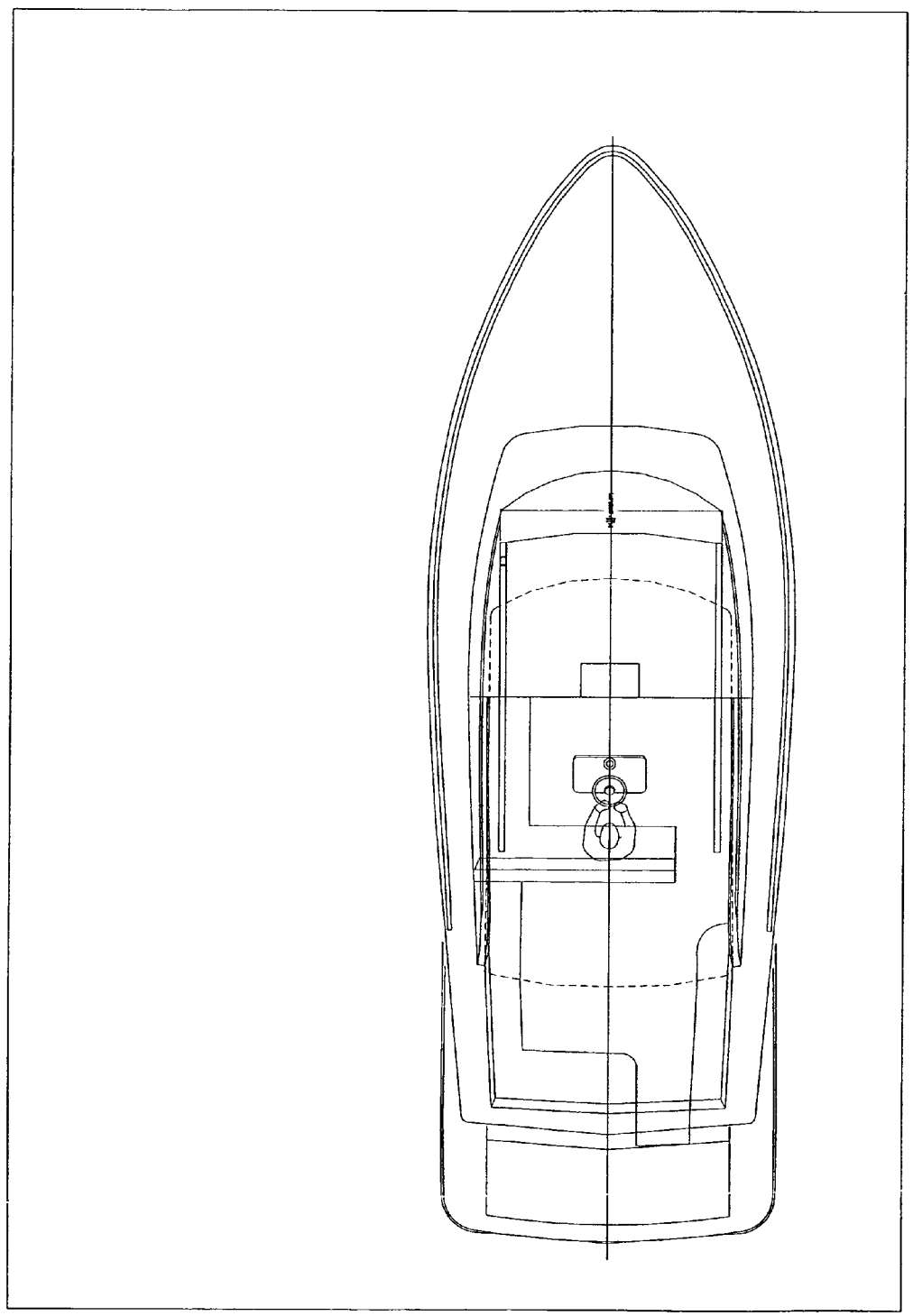
FIG. 1 is a cross-sectional side view of a boat containing the retractable windshield apparatus of the present invention.

As shown in FIG. 1, an operator commands the steering wheel and gears of the boat, facing forward through a windshield.

Figure 2:
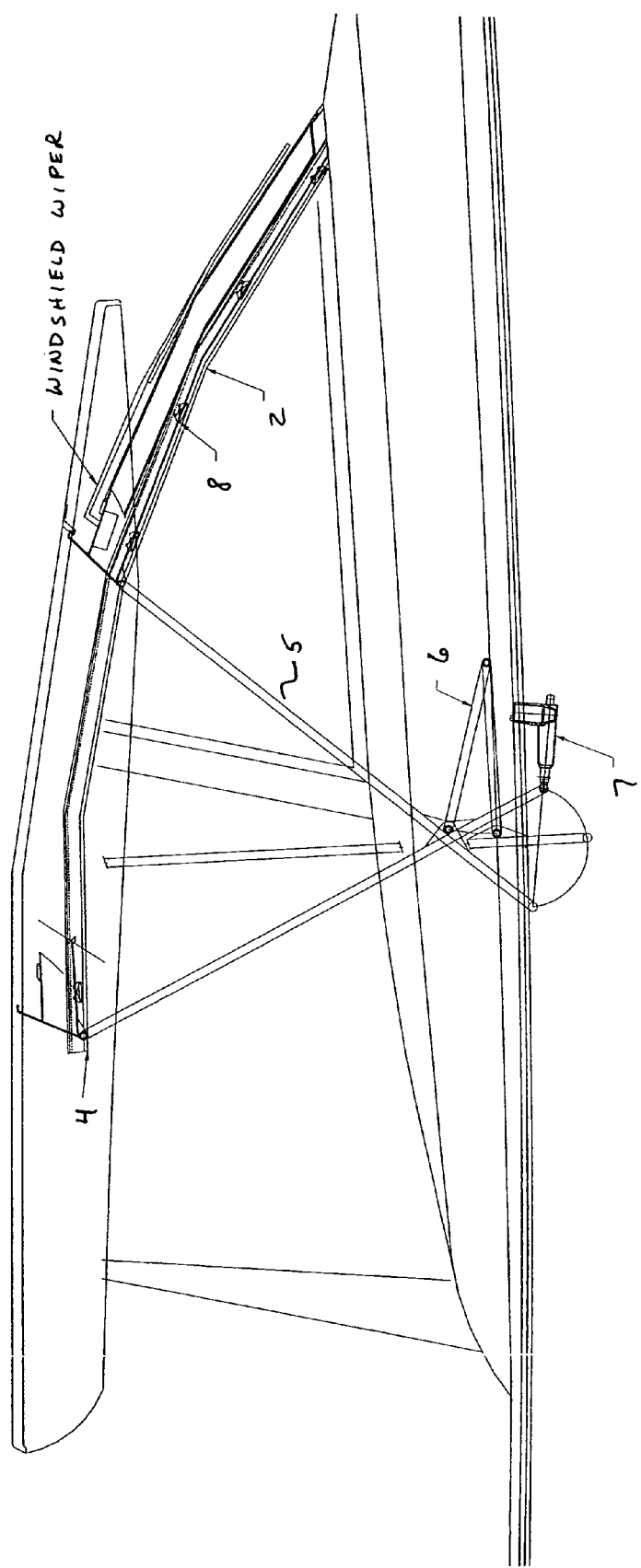
FIG. 2 is a cross-sectional side view of the retractable windshield apparatus of the present invention.

In FIG. 2, retractable windshield apparatus 1 includes first and second opposing traveler tracks 2, 2' adapted to receive and slide the lateral edges of a windshield 3, the first and the second opposing traveler tracks 2, 2' located in a mounting 4 (preferably an SS curved gutter), a first retracting rod 5 functionally attached to the first traveler track 2, a first pivot device 6 functionally attached to the first retracting rod 5, and a first power source 7 (preferably a Linak LA31 Actuator with CB9 Control Box) functionally attached to the first retracting rod 5. In preferred embodiments, the edges of the windshield ride on traveler cars 8 located along the traveler tracks 2, 2'.

Figure 3:
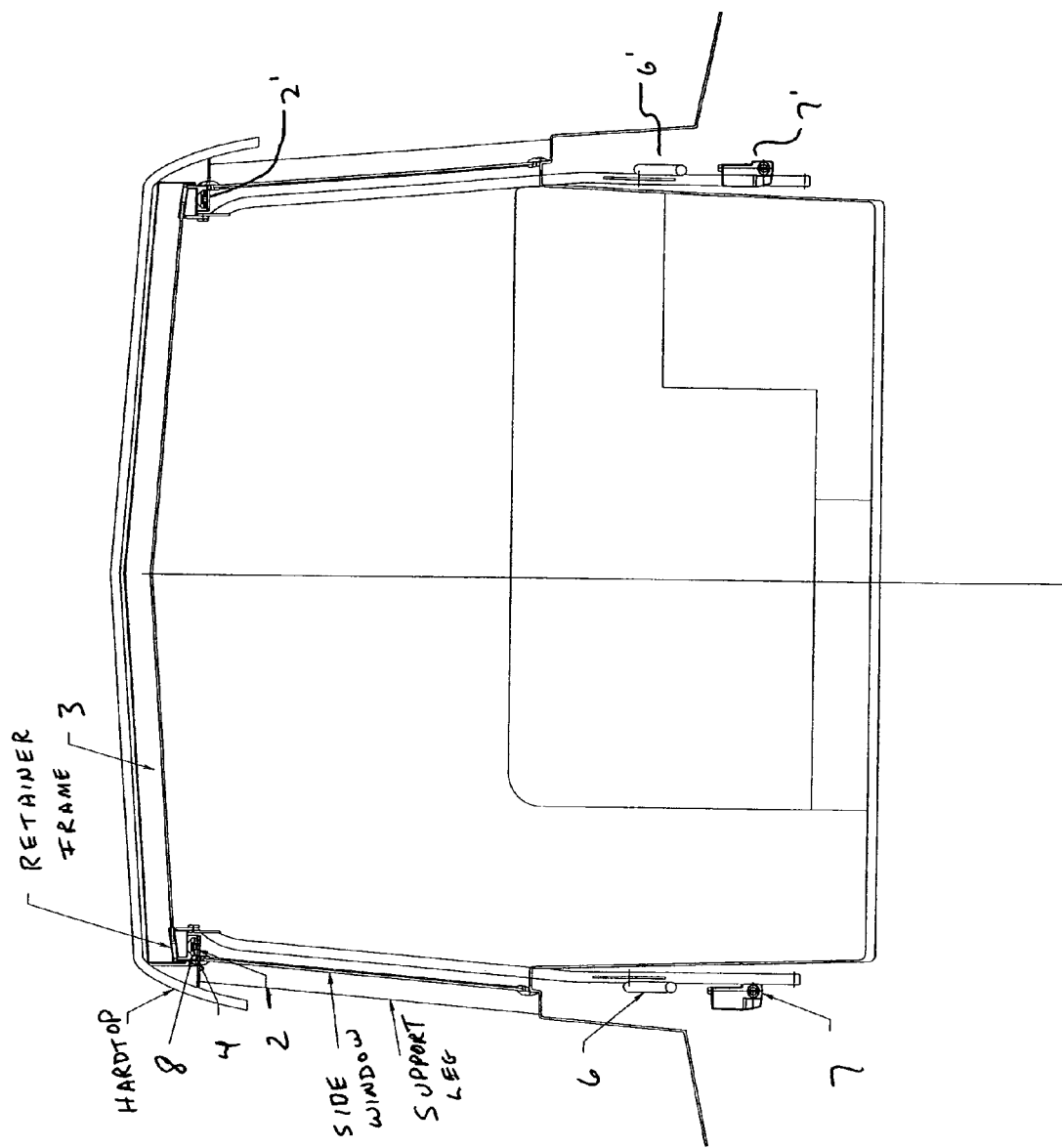
FIG. 3 is a cross-sectional front view of the retractable windshield apparatus of the present invention.

In FIG. 3, the apparatus 1 includes a second retracting rod 5' functionally attached to the second traveler track 2', a second pivot device 6' functionally attached to the second retracting rod 5', and a second power source 7' functionally attached to the second retracting rod 5'.

When in the present invention, the first and the second opposing traveler tracks are described as being located "in" a mounting, the invention includes embodiments in which the opposing traveler tracks are "in" the mounting and embodiments in which the opposing traveler tracks are "on" the mounting.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A retractable windshield apparatus comprising,
   first and second opposing traveler tracks adapted to receive and slide the lateral edges of a windshield,
   the first and the second opposing traveler tracks located in a mounting,
   a first retracting rod functionally attached to the first traveler track,
   a first pivot device functionally attached to the first retracting rod, and
   a first power source functionally attached to the first pivot device.

2. The retractable windshield apparatus according to claim 1, further comprising a first plurality of traveler cars located on the first traveler track and adapted to engage one lateral edge of a windshield.

3. The retractable windshield apparatus according to claim 2, further comprising a second plurality of traveler cars located on the second traveler track and adapted to engage one lateral edge of a windshield.

4. The retractable windshield apparatus according to claim 1, wherein the power source is an actuator.

5. The retractable windshield apparatus according to claim 1, wherein the pivot device is a pivot arm.

6. The retractable windshield apparatus according to claim 5, wherein the pivot arm is made of stainless steel.

7. The retractable windshield apparatus according to claim 1, further comprising a windshield engaged along its lateral edges to first and second opposing traveler tracks.

8. The retractable windshield apparatus according to claim 1, wherein the mounting is a track mounting.

9. The retractable windshield apparatus according to claim 1, wherein the mounting is a curved gutter.

10. The retractable windshield apparatus according to claim 1, further comprising,
- a second retracting rod functionally attached to the second traveler track,
- a second pivot device functionally attached to the second retracting rod, and
- a second power source functionally attached to the second pivot device.

* * * * *